(12) United States Patent
Kokje et al.

(10) Patent No.: US 8,154,990 B2
(45) Date of Patent: Apr. 10, 2012

(54) LESS LOSS IN-ORDER DELIVERY PROTOCOL FOR FIBRE CONNECTION ARCHITECTURE

(75) Inventors: Tejas Kokje, San Jose, CA (US); Ankur Goyal, Fremont, CA (US); Hariharan Balasubramanian, Fremont, CA (US); Ronak Desai, Fremont, CA (US)

(73) Assignee: Cisco Technology Inc., San Jose, CA (US)

(*) Notice: Subject to any disclaimer, the term of this patent is extended or adjusted under 35 U.S.C. 154(b) by 180 days.

(21) Appl. No.: 12/480,447

(22) Filed: Jun. 8, 2009

(65) Prior Publication Data
US 2010/0310253 A1 Dec. 9, 2010

(51) Int. Cl.
*G01R 31/08* (2006.01)
(52) U.S. Cl. .................. 370/216; 370/229; 370/394
(58) Field of Classification Search ............... None
See application file for complete search history.

(56) References Cited

U.S. PATENT DOCUMENTS

| | | | | |
|---|---|---|---|---|
| 5,944,798 A | * | 8/1999 | McCarty et al. | 709/251 |
| 7,324,441 B1 | * | 1/2008 | Kloth et al. | 370/229 |
| 7,406,034 B1 | * | 7/2008 | Cometto et al. | 370/218 |
| 7,647,434 B2 | * | 1/2010 | Cheethirala et al. | 710/29 |
| 2006/0092943 A1 | * | 5/2006 | Sundaram et al. | 370/394 |
| 2009/0052474 A1 | * | 2/2009 | Sasso et al. | 370/503 |
| 2009/0207737 A1 | * | 8/2009 | Pappu et al. | 370/238 |
| 2010/0027427 A1 | * | 2/2010 | Kokje et al. | 370/238 |
| 2010/0310253 A1 | * | 12/2010 | Kokje et al. | 398/45 |

* cited by examiner

*Primary Examiner* — Robert Wilson
(74) *Attorney, Agent, or Firm* — Patterson & Sheridan, LLP

(57) ABSTRACT

Methods and apparatus for providing in-order delivery in Fibre Channel (FC) fabric are disclosed. A topological change between a first switch and a second switch is evaluated to determine whether the topological change may result in out-of-order delivery. If it is determined that the topological change may result in out-of-order delivery, a flush frame is sent to the second switch and stop-on-mark is performed on all interfaces of affected links. Upon receiving the flush frame, the second switch drains all virtual output queues (VOQs) and sends an acknowledgement frame to the first switch. The first switch resumes in-order-delivery in an affected link after receiving the acknowledgement frame or expiration of a lifetime time of a frame.

20 Claims, 8 Drawing Sheets

| 4 | 4 | 4 | 4 | 4 | 4 | 4 |
|---|---|---|---|---|---|---|
| PROTOCOL INSTANCE DISCRIMINATOR | SW_ILS COMMAND CODE | | | C | SUB REQ DISCRIMINATOR | |
| REMOTE IF_INDEX | | | | | | |

FIG. 5

| 4 | 4 | 4 | 4 | 4 | 4 | 4 |
|---|---|---|---|---|---|---|
| PROTOCOL INSTANCE DISCRIMINATOR | SW_ILS COMMAND CODE | | | C | SUB REQ DISCRIMINATOR | |
| NUMBER OF FRAMES ACKNOWLEDGED | | | | | | |
| ⋮ | | | ⋮ | ⋮ | | |

FIG. 6

LESS LOSS IN-ORDER DELIVERY PROTOCOL FOR FIBRE CONNECTION ARCHITECTURE

BACKGROUND

1. Technical Field

Embodiments described in this disclosure generally relate to techniques for reducing loss for data frames requiring in-order delivery on a Fibre Channel fabric. More specifically, embodiments described in this disclosure relate to providing less loss for in-order delivery in a Fibre Channel Fabric following a change in network topology.

2. Description of the Related Art

Switches in a Fibre Channel (FC) fabric, are often connected by multiple inter-switch links (ISL). Some applications, such as storage applications, communicating across a FC fabric, are often not designed to handle out-of-order delivery of frames and require that the FC fabric preserve the order of frames as they are delivered to the destination.

Traffic through the FC fabric is usually sent on some or all of the ISLs based on the cost of each link (dynamically determined by the switches). For example, the cost of each link and paths of flows in the FC fabric may be determined using the known Fabric Shortest Path First (FSPF) routing protocol. Sometimes, one flow may be able to traverse the FC fabric via multiple equal-cost paths. During topology changes in the FC fabric a change in the number of paths a flow can take may result in out-of-order delivery of frames.

To avoid out-of-order delivery, packets in affected flows need to be flushed after detecting a change in topology. For example, flushing packets may be performed by blocking traffic of effected flows for a certain worst-case period of time. One worst-case period of time may be the maximum lifetime of a packet within a switch multiplied by hop counts until the point of interest. Typically, a worst-case period of time is about 500 ms. However, blocking traffic for the worst-case period of time can disrupt network operation as more packets are dropped than necessary and network operation is at least temporarily halted.

SUMMARY

Embodiments described herein relate to methods and apparatus for providing in-order delivery for a Fibre Channel fabric. Embodiments provide a method and apparatus for determining whether a change in topology may result in out-of-delivery. Embodiments also provide a flush frame protocol to drain older frames from all effected queues and minimize the time for which frames are dropped or blocked.

One embodiment includes a Fibre Channel (FC) switch configured to provide in-order frame delivery following changes to a network topology of an FC fabric. The switch may include a routing protocol module configured to select paths between the FC switch and a second switch in the FC fabric. The routing protocol module may generally be configured to perform an operation which includes determining that a change in network topology of the FC fabric allows for frames subsequently sent from the FC switch to the second switch to be delivered out-of-order at a destination device. And in response, obtaining, at the FC switch, a local interface index and a remote interface index for one or more affected links between the FC switch and the second switch, performing a stop-on-mark on each affected link, and sending a flush frame to the second switch for every affected link. The flush frame includes at least the remote interface index. Prior to forwarding any frames to the second switch over the affected links, the routing protocol module may be configured to wait for one of (i) an acknowledgment frame from the second switch and (ii) the timer to expire.

In a particular embodiment, the operation may further include draining any frames present in one or more virtual output queues on the FC switch, where the virtual output queues are identified from the local interface index. Additionally, determining that the change in network topology allows for out-of-order delivery may include identifying (i) a change in equal cost multi-path routes between the FC switch and the second switch, (ii) a first link coming up between the FC switch and the second switch, where a previously detected topology change is within a lifetime of a frame in the FC fabric; and (iii) a best-cost link going down. In response to receiving the flush frame, the second switch may be configured to identify a source index, which may be derived from the remote interface index in the flush frame, drain one or more queues of the second switch referred by the source index, and send the acknowledgment frame to the FC switch.

Another embodiment includes a method for a first switch in a Fibre Channel (FC) fabric to provide in-order frame delivery. The method may generally include monitoring for changes in a network topology of the FC fabric. Upon detecting a change in the network topology, the first switch determines whether the detected change would allow for frames subsequently sent from the first switch to a second switch to be delivered out-of-order at a destination device. If so, the first switch obtains a local interface index and a remote interface index for one or more affected links between the first switch and the second switch drains any frames present in one or more virtual output queues on the first switch. The virtual output queues are identified from the local interface index. The method may also include sending a flush frame to the second switch for every affected link and initiating a timer. Prior to forwarding any frames to the second switch over the affected links, the first switch waits for one of (i) an acknowledgment frame from the second switch and (ii) the timer to expire.

Still another embodiment of the disclosure includes a computer-readable storage medium containing a program, which, when executed on a first switch in a Fibre Channel (FC) fabric performs an operation to provide in-order frame delivery. The operation may generally include monitoring for changes in a network topology of the FC fabric. Upon detecting a change in the network topology, the first switch determines whether the detected change would allow for frames subsequently sent from the first switch to a second switch to be delivered out-of-order at a destination device. If so, the first switch obtains a local interface index and a remote interface index for one or more affected links between the first switch and the second switch drains any frames present in one or more virtual output queues on the first switch. The virtual output queues are identified from the local interface index. The operation may also include sending a flush frame to the second switch for every affected link and initiating a timer. Prior to forwarding any frames to the second switch over the affected links, the first switch waits for one of (i) an acknowledgment frame from the second switch and (ii) the timer to expire.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only

FIG. 5 illustrates an example format for a flush frame, according to one embodiment.

FIG. 6 illustrates an example format for an acknowledge frame, according to one embodiment.

DETAILED DESCRIPTION

Figure 1:
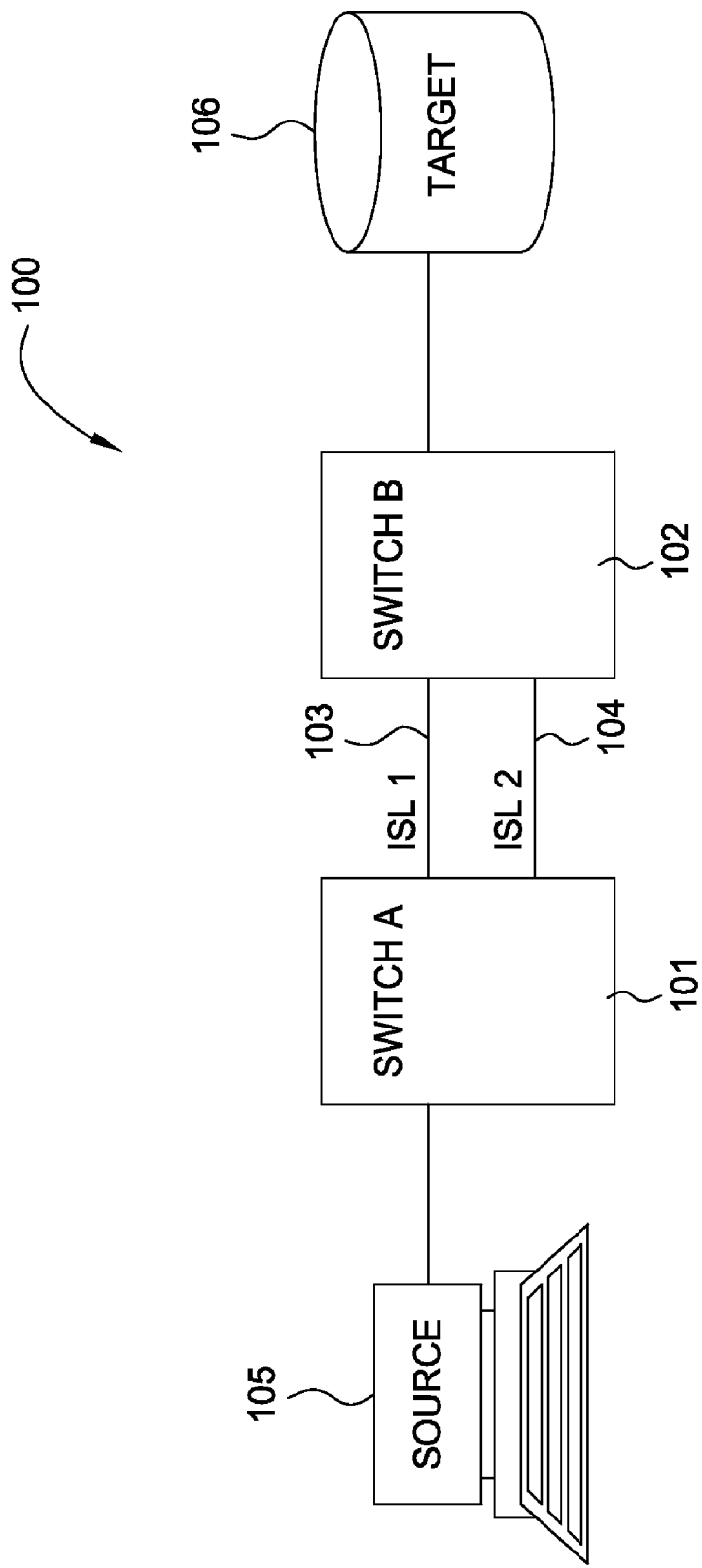
FIG. 1 is a block diagram illustrating an example Fibre connection fabric, according to one embodiment.

Embodiments described herein relate to techniques for reducing the number of frame-drops for data frames requiring in-order delivery on a Fibre Channel fabric. Embodiments provide methods and apparatus for determining whether a change in topology may result in out-of-order delivery. Embodiments also provide a protocol for draining older frames from all affected queues and minimizing the time for which frames are dropped or blocked.

When a topology change is detected, a sender switch determines whether the change is one which may lead to out-of-order delivery for data frames between the sender and a neighbor switch. In one embodiment, the group of changes includes, e.g., a change in number of equal cost multi-path (ECMP); a link coming up between the sender switch and a neighbor switch; and a best-cost link going down with no alternate link. If the topology change is not one of the changes which may result in out-of-order delivery, network traffic is not interrupted.

If the detected change belongs to a change in the group of changes that would lead to out-of order delivery, a new set of paths (N) is generated. In one embodiment, the FC fabric uses Fabric Shortest Path First (FSPF) protocol. The new set of paths (N) includes a new set of shortest paths generated after the topology change is detected. The new set of paths (N) is then evaluated against a current set of paths (O) to determine whether the change may cause out-of-order delivery. If so, a flush frame protocol is initiated before the new set of paths (N) is programmed to the sender switch to replace the current set of paths (O).

The flush frame protocol may include obtaining local interfaces and remote interfaces of every affected link, suspends frame delivery by performing a stop-on-mark on every affected link in the sender switch, and sending a flush frame to the neighbor switch for every affected link. The stop-on-mark generally halts new traffic and flushes already existing frames from the queues for given destination (output) port. In one embodiment, the flush frame comprises interface index and other fields to identify the flush frame.

Upon receiving a flush frame from the sender switch, the neighbor switch may convert the interface index in the flush frame to source index (SI), drains all the relevant queues for the SI, then send an acknowledgement frame to the sender switch. The acknowledgement frame identifies the corresponding flush frame. In one embodiment, a single acknowledgement frame may acknowledge multiple flush frames. Upon receiving the acknowledgement frame, the sender switch removes the stop-on-mark on ports of the affected link and resumes frame delivery.

The switching applications described herein may be distributed on a variety of computer-readable storage media. Additionally, the application programs described herein may be distributed on a variety of computer-readable storage media. Examples of computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. For example, one embodiment described herein includes a computer-readable storage medium, containing a program, which, when executed on a first switch in a Fibre channel (FC) fabric, performs an operation to provide in-order frame delivery.

FIG. 1 is a schematic block diagram illustrating an example Fibre connection (FC) fabric 100, according to one embodiment. As shown, the FC fabric 100 includes a two switch cascaded Fibre Connection Architecture (FICON) topology in native mode. In the native mode, FICON fabrics are at most two node topologies. FIG. 1 illustrates paths from a source 105 to a target 106. All traffic from the source 105 goes through a sender switch 101 and a neighbor switch 102 to reach the target 106. The sender switch 101 and the neighbor switch 102 are Fibre connection switches. However, such traffic may follow two distinct paths.

As shown, the FC fabric 100 includes two inter-switch links (ISL) 103 and 104. In one embodiment, ISL 103 and ISL 104 are of the same cost. That is, the routing cost for traffic from switch 101 to switch 102 is generally the same. In one embodiment, the ISLs 103 and 104 may be used for both load balancing and redundancy for traffic flowing from switch 101 to switch 102. In another embodiment, the ISL 103 and/or ISL 104 are port channels (aggregation of single inter-switch links) and the traffic is load balanced across the port channels.

When ISL 103 and ISL 104 are both up, the FC fabric 100 has two equal cost multi-paths (ECMP) from the source 105 to the target 106 and traffic from the target 105 to the target 106 is load balanced over ISL 103 and ISL 104. When one of ISL 103 and ISL 104 is down, all traffic from the source 105 to the target 106 goes through the remaining ISL.

However, out-of-order delivery may result from either ISL 103 or ISL 104 going down or from either ISL 103 or 104 coming back up. For example, assume ISL 103 is up and ISL 104 is down. In such a case, all frames flow from the source 105 through ISL 103 to reach the target 106. When ISL 104 comes up, a route-selecting module in the sender switch 101 may detect an equal cost route to switch 102 over ISL 104. And subsequently, the switch 101 may load-balance traffic between the ISLs 103 and 104. Some flows of the traffic continue to be sent over ISL 103 while other flows are sent over ISL 104. This may result in newer frames of migrated flows in ISL 104 getting ahead of older frames previously queued in ISL 103. Embodiments disclosed herein provide techniques for maintaining in-order delivery after changes in the topology between two switches in an FC fabric such as the one just described.

The same issue may occur in the other direction for traffic flows from the neighbor switch 102 to the sender switch 101.

Thus, although embodiments are described with respect to traffic going from switch 101 to switch 102, one of skill in the art will recognize that the techniques disclosed herein may be applied to traffic from switch 102 to 101 as well as adapted for more complex Fibre channel fabrics.

Figure 2:
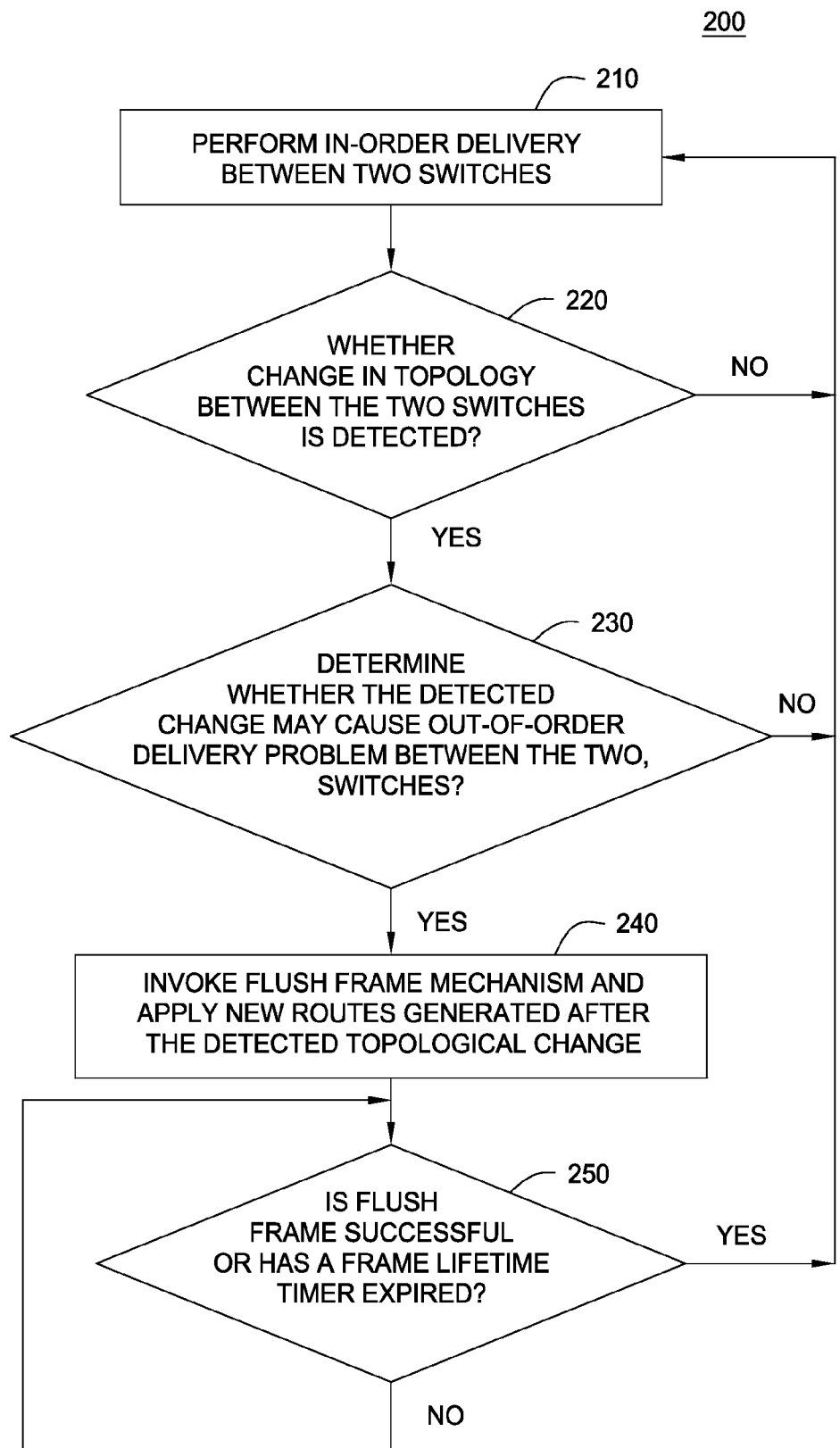
FIG. 2 is a flow chart illustrating a method for performing in-order delivery in a FC fabric, according to one embodiment.

FIG. 2 is a flow chart illustrating a method 200 for performing in-order delivery in a FC fabric, according to one embodiment.

At step 210, frames of one or more flows are sent from a sender switch to a neighbor switch as part of routing traffic through an FC fabric. For example, traffic may flow over either ISL 103 or 104 connecting switch 101 and 102 of FIG. 1. Generally, a "flow" refers to a related group of data frames traversing the fabric from a source to a target. Further, as noted, applications consuming some traffic flows may assume that all traffic is delivered in-order, i.e., that data frames are delivered in the same sequence which they are sent. During in-order delivery, frames associated with each flow are transmitted from the sender switch to the neighbor switch. Flows in the traffic between the sender and neighbor switches may be load balanced over equal-cost routing links (e.g., ISL 103 and 104).

At step 220, a switch in a FC fabric monitors for changes in topology. For example, a switch may identify when a link between itself and a peer switch comes up, goes down, or changes port-channel membership. So long as no topology changes are detected, data frames are delivered (in-order) without interruption. However, when a change is detected, there in-order delivery can be disrupted.

At step 230, it is determined whether a detected change may result in out-of-order delivery. For example, a routing protocol module in the switch which detects the change in topology may determine whether the detected change may cause out-of-order delivery. If it is determined that the detected change will not lead to out-of-order delivery, no further action is needed and in-order delivery from switch 101 to switch 102 can be performed without interruption.

In one embodiment, the process for evaluating whether a change in topology may cause out-of-order delivery may be performed in two phases. First, the detected topological change is examined to determine whether it belongs to a group of events that may cause out-of-order delivery. If so, the routing protocol module in the sender switch further determines whether a set of local interfaces leading towards a destination has changed in a way that can result in frames being delivered out-of-order. One embodiment of a method for performing step 230 is illustrated in FIG. 3.

Figure 4:
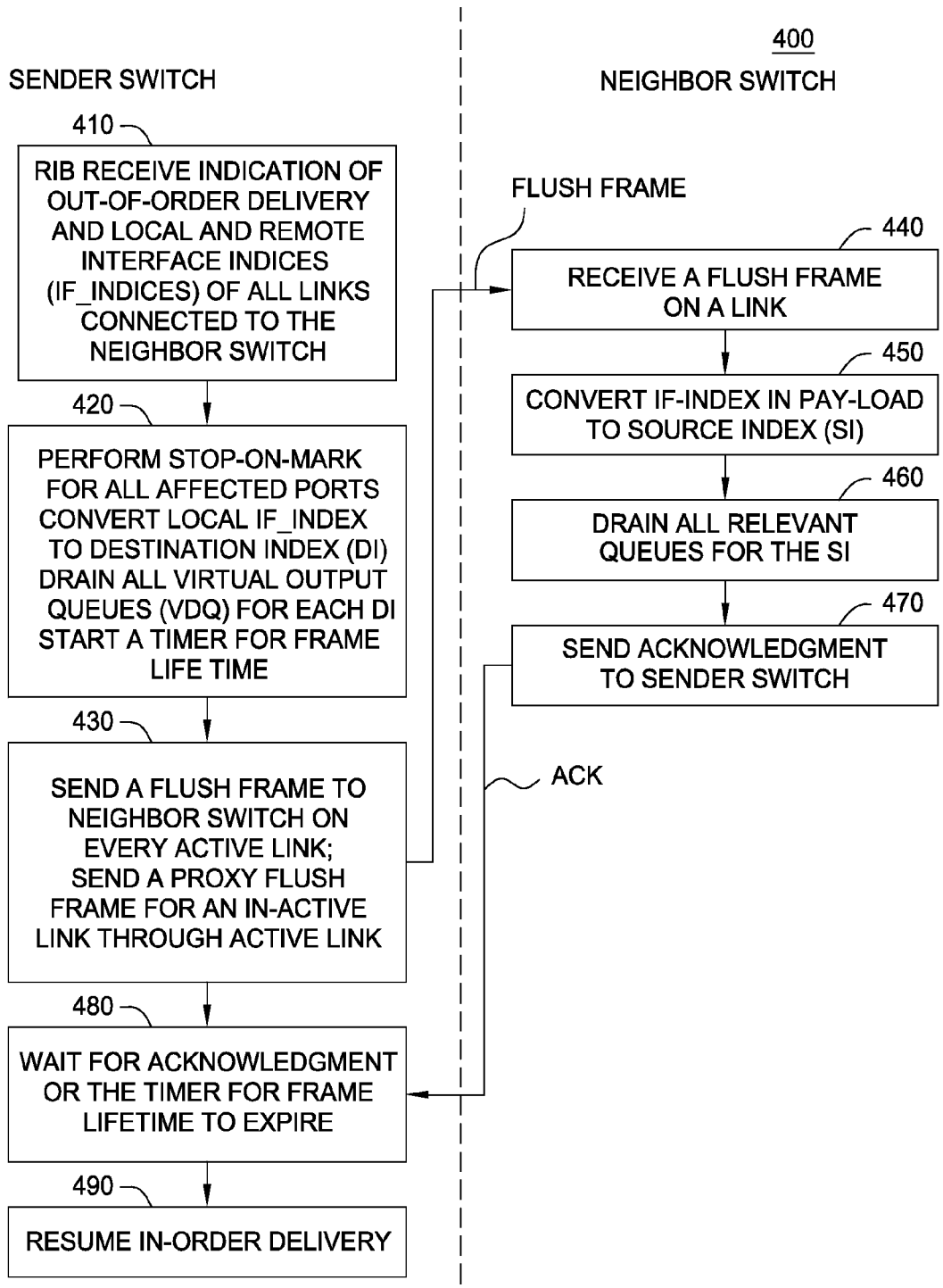
FIG. 4 is a flow chart illustrating a method for implementing a flush frame mechanism, according to one embodiment.

If it is determined that a change in network topology will not cause out-of-order delivery, frame delivery continues without interruption. Otherwise, however, at step 240, a flush frame mechanism is invoked. As described in greater detail herein, the flush frame mechanism may generally include performing a stop-on-mark on all affected local interfaces in the sender switch, draining virtual output queues (VOQs) on each such interface, and sending flush frames to remote interfaces on a neighbor switch of the affected link. Additionally, new routes generated after the topological change may be applied to the switch's routing information base (RIB). FIG. 4, described below, illustrates an embodiment of a flush frame mechanism.

At step 250, the sender switch waits for a message indicating that the neighbor switch has flushed frames from each affected interface, up to an amount of time equal to the maximum frame lifetime. Once the sender switch receives an acknowledgement frame for each flush frame sent (or times out), new routes are used in the resumed delivery.

Figure 3:
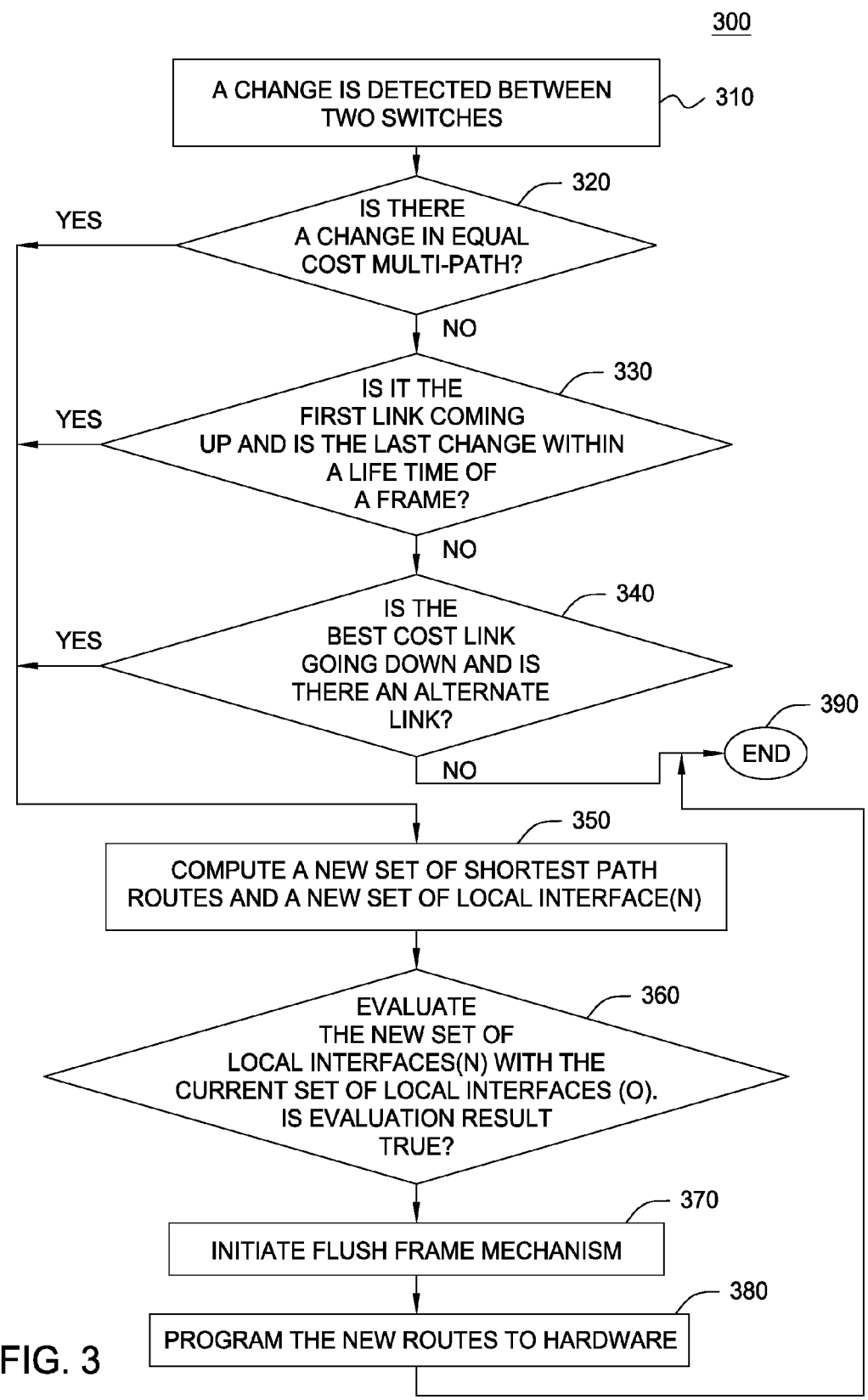
FIG. 3 is a flow chart illustrating a method for determining whether a change in topology between two switches in a FC fabric may cause out-of-order delivery, according to one embodiment.

FIG. 3 is a flow chart illustrating a method 300 for determining whether a change in topology between two switches in a FC fabric may cause out-of-order delivery, according to one embodiment. The method 300 may be performed in step 230 of the method 200 of FIG. 2. At steps 320, 330 and 340, the change in network topology is evaluated to determine whether it is a type of change that may result in out-of-order frame delivery. The group of events may be predetermined according to topology of the FC fabric and/or the routing module used in the FC fabric.

For example, the FC fabric may deliver frames using the Fabric Shortest Path First (FSPF) protocol. The FSPF protocol tracks the state of the links on all switches in a FC fabric and associates a cost with each link. The FSPF protocol computes paths from a switch to all other switches in the FC fabric by adding the cost of all the links traversed by the path and choosing the path that minimizes the cost. In such an FC fabric, events which may cause out-of-order delivery include (1) a change in equal cost multi-path (ECMP), such as a new ECMP comes up or one or more ECMPs go down; (2) a link comes up between two switches and a previous change occurred within a frame lifetime; and (3) a "best-cost" link goes down and there are alternate (costlier) links.

If it is decided that a particular topology change is not one of the events listed in steps 320, 330, and 340, the method 300 ends at step 390 without interrupting frame delivery in the FC fabric. Thus, steps 320, 330, and 340 reduce interruptions and frame drops by ignoring topology changes that are not a source of out-of-order delivery. For example, when a first link between two switches comes up after no link was present between the two switches during a frame lifetime, frames delivered from the first link will not be out-of-order since there are not any residual frames in virtual output queues (VOQs) of the sender switch and the neighbor switch.

Otherwise, if one of the events reflected in steps 320, 330 and 340 has occurred, then at step 350 a new set of routes may be computed using the routing protocol (e.g., FSPF) taking into account the changed topology. In one embodiment, a new set of local interfaces N in the sender switch towards all destinations reachable through the neighbor switch is generated from the new set of routes.

At step 360, the new set of local interfaces (N) is compared with a current set of local interfaces (O) towards all destinations reachable through the neighbor switch to determine whether the detected change may cause out-of-order delivery. The current set of local interfaces (O) is associated with a set of paths currently used by the sender switch.

In one embodiment, the sets (N) and (O) are evaluated to determine whether out-of-order delivery may occur. For example, in one embodiment, (N) and (O) are evaluated using the following logical expression:

$$[N \neq O \&\& O \neq \{\}]\ ||\ [N \neq \{\} \&\& O = \{\} \&\& N_T - O_T < \text{a lifetime of a frame}]$$

Where $N_T$ is the time when N is generated, $O_T$ is the time of when O is generated, && denotes logical AND, and || denotes logical OR. For FSPF protocol, out-of-order delivery may occur when the logical expression evaluates to "true." In particular, the logical expression is true when N and O are different and O is not empty or when N is not empty and N and O were generated within a lifetime of a frame if O is empty. If either condition is true, then out-of-order frame delivery is possible.

If so, then at step 370, a flush frame mechanism is initiated. However, if it is determined that out-of-order delivery will not occur, then at step 380 new set of routes may be programmed into the sender switch for subsequent in-order delivery.

FIG. 4 is a flow chart illustrating a method 400 for implementing a flush frame mechanism, according to one embodiment. At step 410, the Routing Information Base (RIB) module of the sender switch receives an indication that an out-of-order delivery may occur. In one embodiment, the indication may be sent from FSPF module on sender switch. In one embodiment, the indication to RIB includes a list of local and remote interfaces of all links connected to the neighbor switch. The local and remote interfaces may be determined by the routing protocol, such as FSPF.

At step 420, the sender switch stops flows for all ports connected to the neighbor switch through links affected by the topology change. In one embodiment, stopping the flows of affected links comprises performing stop-on-mark for all ports connected to the neighbor switch of the affected links. The RIB and Forwarding Information Base (FIB) of the sender switch converts the local interface indices to destination indices (DI) and drain all VOQs for the DI. The RIB also starts a lifetime timer for the instance of the topology change.

At step 430, the sender switch sends a flush frame to the neighbor switch for every active link. This flush frame includes a remote if_index and other fields to identify the particular flush frame. In one embodiment, a flush frame is sent on every active link in the new set of local interfaces N in the sender switch towards all destinations reachable through the neighbor switch.

When the change in network topology is that of a link going down, it is not possible to send a flush frame through that link. Accordingly, in one embodiment, the sender switch sends out a proxy flush frame for the in-active link on any of the active links.

FIG. 5 provides an example of a format for a flush frame, according to one embodiment. Illustratively, the example format includes the following fields:

SW_ILS Command Code, which contains a vendor specific command code. This command code may be one of the unused values between 0x70000000-0x7D000000 or 0x90000000-0x9F000000.

Protocol Instance Discriminator is a 16 bit unique identifier for a given instance for the flush protocol. Protocol Instance Discriminator is identical for Flush Frames sent on all links in set N associated with a particular change in network topology.

Class of service bits is 4 bit field specifying a priority of the VOQ from which this Flush Frame was sent. For example, in Cisco's MDS architecture, there are four VOQs for a given output port. Hence four flush frames are needed for each output port. This Class of service bits field identifies the four flush frames sent out from the same port.

Sub Request Discriminator is 12 bit field identifies every Flush Frame that sent for a given Protocol Instance Discriminator.

Remote IF-INDEX is the local interface index (if_index) of the neighbor port on which this flush frame is sent. In case of proxy flush frame, Remote IF-INDEX represents if_index of the remote port for which this proxy flush frame is being sent.

Referring back to FIG. 4, at step 440, the neighbor switch receives a flush frame on an active link. At step 450, the neighbor switch converts the Remote IF-INDEX in the payload of the flush frame to a source index (SI). In step 460, an RIB of the neighbor switch sends a message to an FIB of the neighbor switch to drain all the relevant queues for the SI and the FIB replies back to the RIB after draining.

In step 470, RIB of the neighbor switch sends an acknowledgment message (ACK) containing the same protocol discriminator and frame identifier as in the received flush frame message. In short, neighbor switch acts as a server servicing request to flush SI for if_indices given by a client, the sender switch.

To improve scalability, neighbor switch may use its associated RIB to gather flush frame messages across several links and send a single message to a FIB. Moreover, ACK frame format, described in FIG. 6, allows for single ACK frame to acknowledge multiple flush frames. The neighbor switch need not send one ACK frame for each flush frame; instead, the neighbor switch can acknowledge all received flush frames with a single ACK frame.

FIG. 6 provides an example format for an acknowledge frame, according to one embodiment. Illustratively, the example format includes the following fields:

SW_ILS Command Code is the first word of the ACK frame and contains a vendor specific command code. This command code is one of the unused values between 0x70000000-0x7D000000 or 0x90000000-0x9F000000. This value should be different from the SW_ILS Command Code used in flush frame of FIG. 5.

Number of Frames Acknowledged denotes the number of Flush Frames this ACK frame is acknowledging. As mentioned earlier, a single ACK frame can acknowledge multiple Flush Frames.

Protocol Instance Discriminator identifies instance of protocol to which this ACK message belongs. This value was obtained from the flush frame received from the sender switch.

Class of service bits is 4 bit field specifies priority of the VOQ from which flush frame was sent. This value was obtained from the flush frames received from the sender switch.

Sub Request Discriminator is 12 bit field identifies every flush frame that is being sent for a given Protocol Instance Discriminator. This value was obtained from the flush frame received from the sender switch.

Protocol Instance Discriminator, Class of Service bits & Sub Request Discriminator form a tuple. There is one tuple for every flush frame that is being acknowledged by the ACK frame. In other words, the number of these tuples should be equal to the value in Number of Frames Acknowledged field.

Referring back to FIG. 4, in step 480, the sender switch waits for an ACK message from the neighbor switch or for a timer to expire. At step 490, the sender switch resumes sending frames after receiving acknowledgment frame from the neighbor switch or expiration of the frame lifetime timer.

Figure 7:
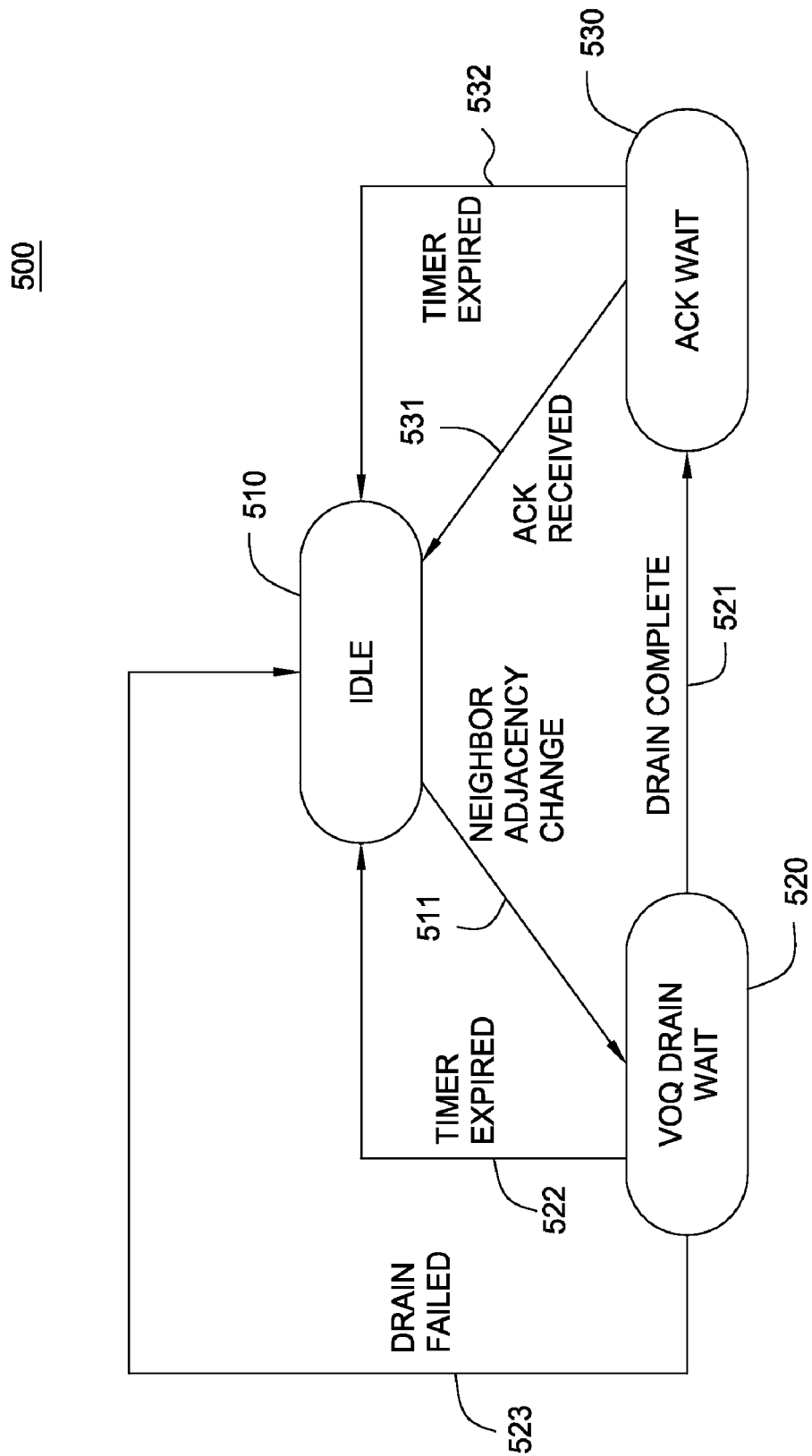
FIG. 7 is a flow chart illustrating a finite state machine for a sender switch, according to one embodiment.
Figure 8:
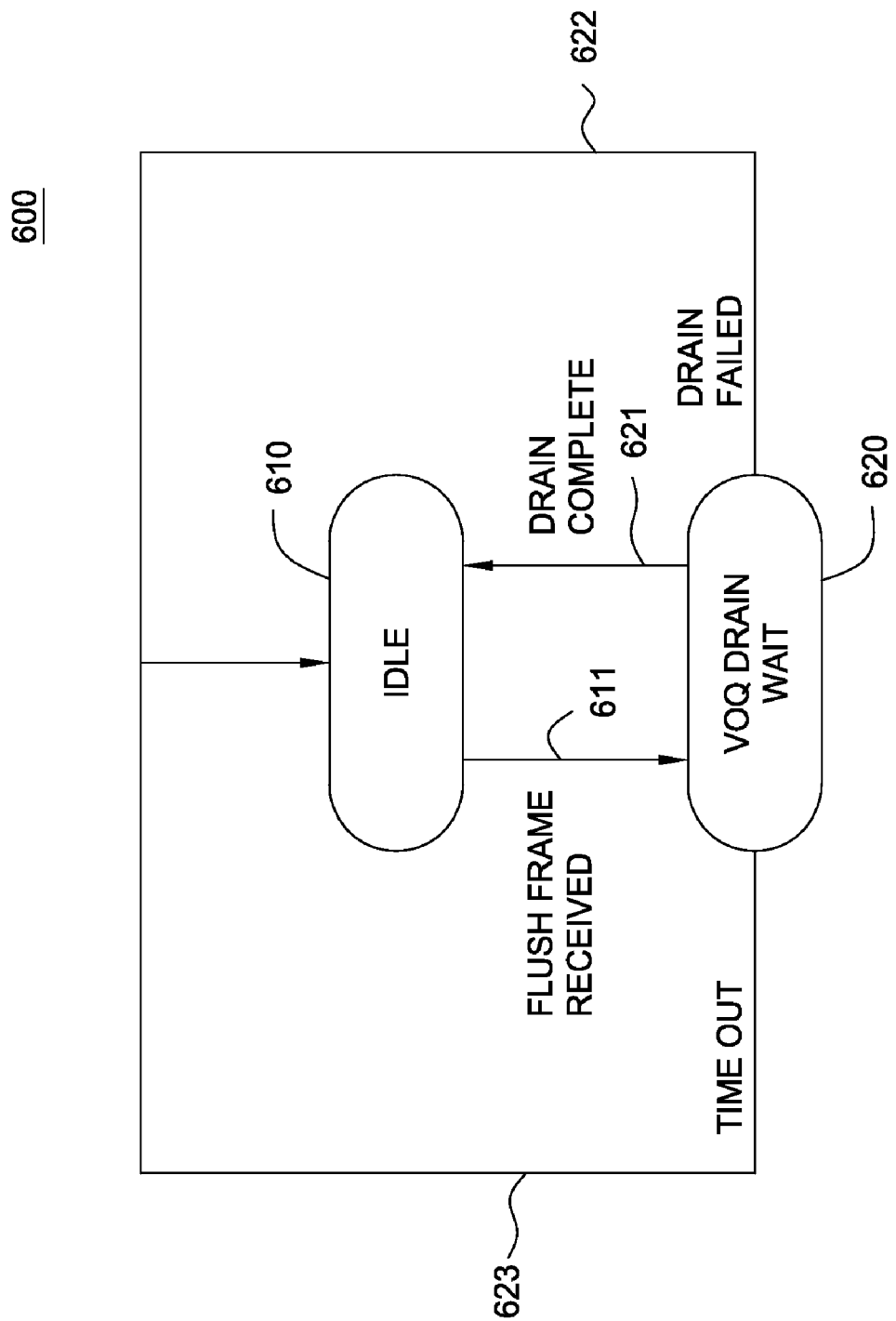
FIG. 8 is a flow chart illustrating a finite state machine for a neighbor switch, according to one embodiment.

FIGS. 7 and 8 illustrate example finite state machines (FSM) for a sender and a neighbor switch for carrying out the flush frame protocol according to on embodiment. Because each switch is both a sender switch and a neighbor switch depending on flow of traffic, every switch implements both a sender FSM and a neighbor FSM.

As shown in FIG. 7, a finite state machine (FSM) 500 for a sender switch, includes three states, idle state 510, VOQ drain wait state 520 and acknowledge wait state 530.

Transition 511 corresponds to the sender RIB receiving an indication that a topology change is detected and the sender FSM 500 changing from the idle state 510 to VOQ drain wait state 520. Transition 511 also corresponds to the sender RIB starting a frame lifetime timer, sending message to affected linecards requesting them to perform stop-on-mark and drain VOQs in the affected DI.

Transition 521 corresponds to the sender RIB receiving a drain complete message from linecards and the sender FSM 500 changing from VOQ drain wait state 520 to an ACK wait state 530. Transition 521 also corresponds to the sender switch sending a flush frame to a neighbor switch.

Transition 522 corresponds to the frame lifetime timer expiring and the sender FSM 500 changing from VOQ drain wait state 520 to an idle state 510. Transition 522 also corresponds to the sender switch cleaning up, aborting the flush frame protocol, and restarting traffic (again, following the expiration of the frame-lifetime time).

Transition 523 corresponds to the sender switch receiving a message of draining failure and the sender FSM 500 changing from VOQ Drain Wait state 520 to idle state 510. Transition 523 also corresponds to the sender switch logging errors in draining, aborting the flush frame protocol and waiting for expiration of frame lifetime timer to restart traffic.

Transition 531 corresponds to the sender switch receiving an acknowledge frame (i.e., an ACK message) from the neighbor switch and the sender FSM 500 changing from ACK wait state 530 to the idle state 510. Transition 531 also corresponds to the sender switch cleaning up and restarting traffic.

Transition 532 corresponds to expiration of the frame lifetime timer and the sender FSM 500 changing from ACK wait state 530 to the idle state 510. Transition 531 also corresponds to the sender switch cleaning up and aborting flush frame protocol, and restarting traffic.

FIG. 8 is a flow chart illustrating a finite state machine 600 for a neighbor switch, according to one embodiment. The neighbor FSM 600 has two states, idle state 610, VOQ drain wait state 620.

Transition 611 corresponds to the neighbor switch receiving a flush frame from a sender switch and the neighbor FSM 600 changing from an idle state 610 to a VOQ drain wait state 620. Transition 611 also corresponds to the neighbor RIB sending message to affected linecards requesting them to perform stop-on-mark and drain relevant queues in the affected SIs.

Transition 621 corresponds to the neighbor switch receiving a drain complete message from linecards and the neighbor FSM 600 changing from VOQ drain wait state 620 to idle state 610. That is, transition 621 corresponds to the completed draining of frames on a given output queue following the receipt of a flush frame message. Transition 621 also corresponds to the neighbor switch sending an ACK frame to the sender switch and performing any associated clean up.

Transition 622 corresponds to the neighbor switch receiving a drain failed message from linecards and the neighbor FSM 600 changing from the VOQ drain wait state 620 to the idle state 610. Transition 622 also corresponds to the neighbor switch logging draining errors, cleaning up and aborting the protocol.

Transition 623 corresponds to expiration of frame lifetime timer and the neighbor FSM 600 changing from the VOQ drain wait state 620 to the idle state 610. Transition 623 also corresponds to the neighbor switch cleaning up and aborting the protocol.

Figure 9:
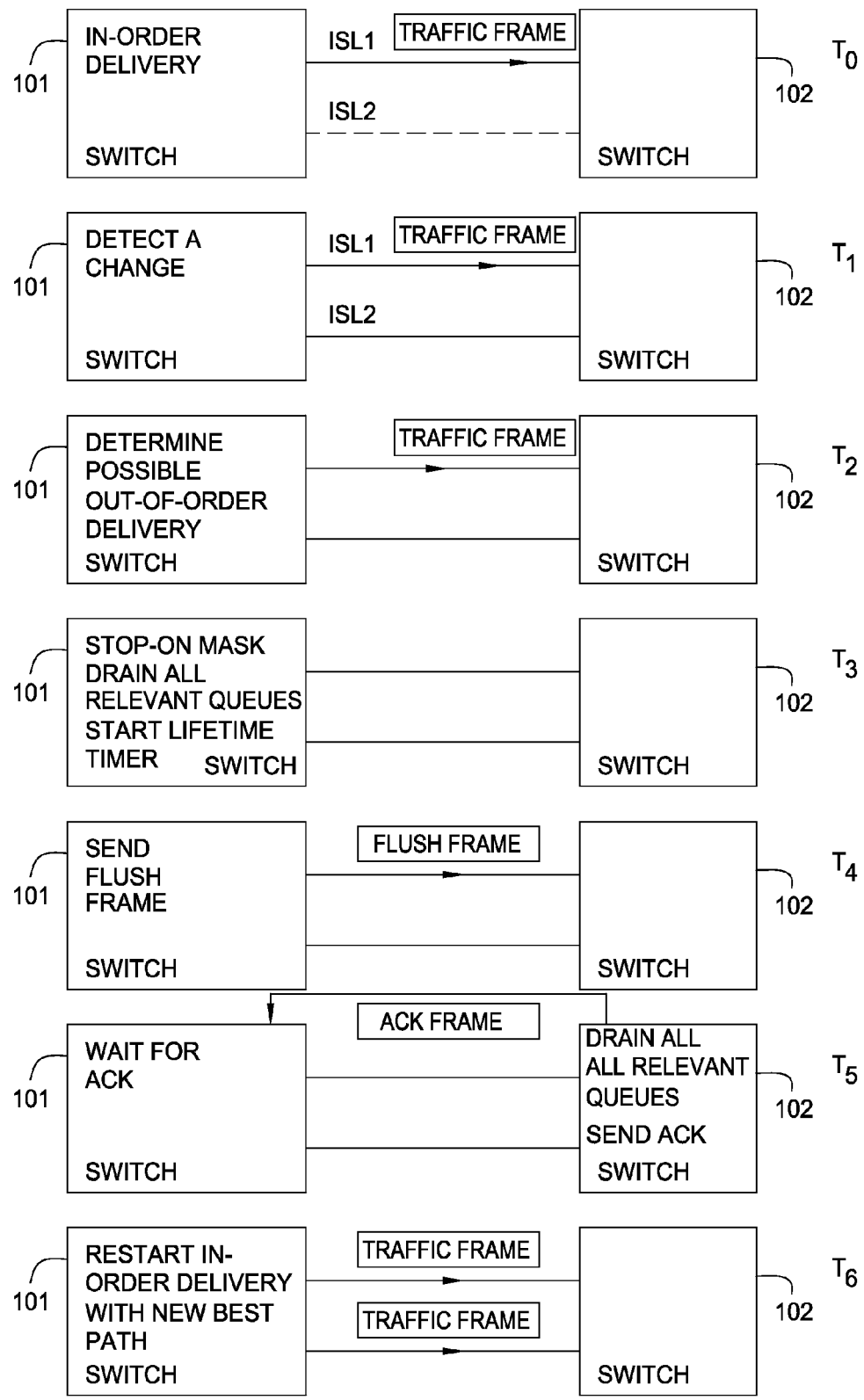
FIG. 9 is a time-sequence diagram illustrating a scenario of a frame flushing process, according to one embodiment.

FIG. 9 is a time-sequence diagram illustrating a scenario of a frame flushing process, according to one embodiment. In this example, a switch 101 is connected to a switch 102 using two ISL links (labeled ISL1 and ISL2). Additionally, it is presumed the switch 101 and 102 may be connected to other switching infrastructure elements in an FC Fabric, and that at least some elements of the fabric are connected to endpoints, e.g., a source and target for a SCSI write operation where commands need to be delivered in-order to the target.

At time T0, the sender switch 101 performs in-order delivery to the neighbor switch 102 through inter-switch link ISL1. There is another inter-switch link ISL2 between the sender switch 10 and the neighbor switch 102. ISL1 and ISL2 have the same the same cost. However, at T0, ISL2 is down.

At time T1, ISL2 comes up and the sender switch 101 detects this change in network topology.

At time T2, the routing protocol module in the sender switch 101 determines whether the change in topology may cause out-of-order delivery. In one embodiment, the method 300 of FIG. 3 may be used to determine whether an out-of-order delivery may occur.

At time T3, the sender switch 101 confirms that the change in topology is one that may result in out-of-order delivery. In response, the sender switch 101 stops traffic to the neighbor switch (e.g., performs a stop-on-mark on the outgoing interfaces), initiates a timer, and drains destination index corresponding to ISL1.

At time T4, the sender switch 101 sends flush frames to the neighbor switch 102 via ISL1. At time T5, the neighbor switch 102 receives the flush frame, and in response, and drains the related source index. That is, the neighbor switch 102 drains all output queues that may have traffic from sender switch 101 that could result in frames being delivered out-of-order if traffic were to begin flowing over ISL2. Once drained, the neighbor switch 102 then sends an ACK frame to the sender switch 101.

At time T6, the new routes (in this example, the ISL2 link between switch 101 and 102) are programmed in to the RIB of the sender switch 101, and the sender switch 101 restarts traffic by sending traffic frames via both ISL1 and ISL2. In one embodiment, traffic may be load-balanced between ISL1 and ISL2. Similarly, if the timer expires on sender switch 101 before receiving an ACK frame, meaning that enough time has elapsed to guarantee that any frames sent from switch 101 have been delivered (or otherwise dropped), then the sender switch programs the new routes in its RIB and begins routing traffic over both ISL1 and ISL2.

Advantageously, embodiments described herein provide a protocol between two or more switches which achieves the draining of older traffic from all the queues to guarantee in-order frame delivery and minimize the time for which frames are dropped or blocked following certain changes in network topology.

While the foregoing is directed to embodiments of the present disclosure, other and further embodiments of the disclosure may be devised without departing from the basic scope thereof, and the scope thereof is determined by the claims that follow.

What is claimed is:

1. A Fibre channel (FC) switch configured to provide in-order frame delivery following changes to a network topology of an FC fabric, the FC switch comprising:
   a processor configured to execute a routing protocol module configured to select network paths connecting the FC switch and a second switch in the FC fabric, wherein the routing protocol module is configured to perform an operation, the operation comprising:
   upon determining that a detected change in network topology of the FC fabric allows for in-order frames subsequently sent from the FC switch to the second switch in the FC fabric to be delivered out-of-order at a destination device:
   obtaining, from a memory on the FC switch, a local interface index and a remote interface index for one or more links connecting the FC switch and the second switch, the one or more links affected by the detected change in network topology,
   performing a stop-on-mark on each of the one or more affected links, sending a flush frame to the second switch for each of the one or more affected links, wherein the flush frame includes at least the remote interface index, initiating a timer, and preventing any of the in-order frames from being forwarded to the second switch over the one or more affected links, until either (i) receiving an acknowledgment frame from the second switch or (ii) the timer expires.

2. The FC switch of claim 1, wherein the operation further comprises, draining any frames present in one or more virtual output queues on the FC switch, wherein the virtual output queues are identified from the local interface index.

3. The FC switch of claim 1, wherein determining the detected change allows for frames to be delivered out-of-order at the destination device comprises determining whether the change in network topology comprises at least one of:
   a change in equal cost multi-path routes between the FC switch and the second switch;
   a first link coming up between the FC switch and the second switch, and a previously detected change is within a lifetime of a frame in the FC fabric; and
   a best-cost link going down.

4. The FC switch of claim 1, wherein determining whether the detected change allows for frames to be delivered out-of-order at the destination device further comprises:
   generating a new set of local interfaces N from a new set of routes in the FC switch;
   evaluating a predicate of the new set of local interfaces N and a set of current local interfaces O from a set of current routes programmed in the FC switch, wherein if the predicate is true, the detected change allows for out-of-order delivery, wherein the predicate is:

$[N \neq O \&\& O \neq \{\}] \| [N \neq \{\} \&\& O = \{\} \&\& N_T - O_T < \text{a lifetime of a frame}]$, wherein $N_T$ is the time when N is generated, $O_T$ is the time of when O is generated, $\{\}$ denotes an empty set, $\&\&$ denotes logical AND, and $\|$ denotes logical OR.

5. The FC switch of claim 1, wherein the operation further comprises programming the new set of routes N into a routing information base (RIB) of the FC switch.

6. The FC switch of claim 1, wherein the second switch is configured to:
   upon receiving the flush frame, identify a source index for the second switch, wherein the source index is derived from the remote interface index in the flush frame;
   drain one or more virtual output queues of the second switch referred to by the source index; and
   send the acknowledgment frame to the FC switch.

7. The FC switch of claim 6, further comprising, receiving, at the FC switch, the acknowledgment frame.

8. The FC switch of claim 1, wherein sending a flush frame to the second switch comprises:
   sending the flush frame to the second switch on every affected link that is active; and
   sending the proxy flush frame to at least a third switch for every affected link between the FC switch and the second switch that is inactive, wherein the proxy flush frame is addressed to the second switch.

9. A method, comprising:
   monitoring, by a first Fibre Channel (FC) switch, for changes in a network topology of a Fibre Channel (FC) fabric in which the first FC switch is participating;
   upon detecting a change in the network topology, determining whether the detected change would allow for frames subsequently sent from a first switch to a second switch to be delivered out-of-order at a destination device; and
   upon determining that the detected change allows for frames to be delivered out-of-order at the destination device:
      obtaining, from a memory on the FC switch, a local interface index and a remote interface index for one or more links connecting the FC switch and the second switch, the one or more links affected by the detected change in network topology,
      draining any frames present in one or more virtual output queues on the first switch, wherein the virtual output queues are identified from the local interface index,
      performing a stop-on-mark on each of the one or more affected links,
      sending a flush frame to the second switch for each of the one or more affected links, wherein the flush frame includes at least the remote interface index,
      initiating a timer, and
      preventing any frames requiring in-order delivery from being forwarded to the second switch over the one or more affected links, until either (i) receiving an acknowledgment frame from the second switch or (ii) the timer expires.

10. The method of claim 9, wherein determining whether the detected change allows for frames to be delivered out-of-order at the destination device comprises determining whether the detected change comprises at least one of:
   a change in equal cost multi-path routes between the first switch and the second switch;
   a first link coming up between the first switch and the second switch, and a previously detected change is within a lifetime of a frame in the FC fabric; and
   a best-cost link going down.

11. The method of claim 10, wherein determining whether the detected change allows for frames to be delivered out-of-order at the destination device further comprises:
   generating a new set of local interfaces N from a new set of routes in the first switch;
   evaluating a predicate of the new set of local interfaces N and a set of current local interfaces O from a set of current routes programmed in the first switch, wherein if the predicate is true, the detected change allows for out-of-order delivery, wherein the predicate is:

$[N \neq O \&\& O \neq \{\}] \| [N \neq \{\} \&\& O = \{\} \&\& N_T - O_T < \text{a lifetime of a frame}]$, wherein $N_T$ is the time when N is generated, $O_T$ is the time of when O is generated, $\{\}$ denotes an empty set, $\&\&$ denotes logical AND, and $\|$ denotes logical OR.

12. The method of claim 11, further comprising programming the new set of routes N into a routing information base (RIB) of the first switch.

13. The method of claim 10, wherein the second switch is configured to:
   upon receiving the flush frame, identify a source index for the second switch, wherein the source index is derived from the remote interface index in the flush frame;
   drain one or more virtual output queues of the second switch referred to by the source index; and
   send the acknowledgment frame to the FC switch.

14. The method of claim 13, further comprising, receiving, at the first switch, the acknowledgment frame.

15. The method of claim 10, wherein sending a flush frame to the second switch comprises:

sending the flush frame to the second switch on every affected link that is active; and sending a proxy flush frame to at least a third switch for every affected link between the first and second switch that is inactive, wherein the proxy flush frame is addressed to the second switch.

16. A non-transitory computer-readable storage medium, containing instructions, which, when executed by a first switch in a Fibre channel (FC) fabric performs at least the following:

monitoring for changes in a network topology of the FC fabric;

upon detecting a change in the network topology, determining whether the detected change would allow for in-order frames subsequently sent from the first switch to a second switch to be delivered out-of-order at a destination device; and upon determining that the detected change allows for frames to be delivered out-of-order at the destination device:

obtaining, from a memory on the FC switch, a local interface index and a remote interface index for one or more links connecting the FC switch and the second switch, the one or more links affected by the detected change in network topology, draining any frames present in one or more virtual output queues on the first switch, wherein the virtual output queues are identified from the local interface index, performing a stop-on-mark on each of the one or more affected links, and sending a flush frame to the second switch for every each of the one or more affected links, wherein the flush frame includes at least the remote interface index, initiating a timer, and preventing any of the in-order frames from forwarding to the second switch over the one or more affected links, until either (i) receiving an acknowledgment frame from the second switch or (ii) the timer expires.

17. The non-transitory computer-readable storage medium of claim 16, wherein determining whether the detected change allows for frames to be delivered out-of-order at the destination device comprises determining whether the detected change comprises at least one of:

a change in equal cost multi-path routes between the first switch and the second switch;

a first link coming up between the first switch and the second switch, and a previously detected change is within a lifetime of a frame in the FC fabric; and a best-cost link going down.

18. The non-transitory computer-readable storage medium of claim 16, wherein determining whether the detected change allows for frames to be delivered out-of-order at the destination device further comprises:

generating a new set of local interfaces N from a new set of routes in the first switch;

evaluating a predicate of the new set of local interfaces N and a set of current local interfaces O from a set of current routes programmed in the first switch, wherein if the predicate is true, the detected change allows for out-of-order delivery, wherein the predicate is:

$[N \neq O \&\& O \neq \{\}] \| [N \neq \{\} \&\& O = \{\} \&\& N_T - O_T < \text{a lifetime of a frame}]$, wherein $N_T$ is the time when N is generated, $O_T$ is the time of when O is generated, {} denotes an empty set, && denotes logical AND, and || denotes logical OR.

19. The non-transitory computer-readable storage medium of claim 18, wherein the operation further comprises, programming the new set of routes N into a routing information base (RIB) of the first switch.

20. The non-transitory computer-readable storage medium of claim 16, wherein the second switch is configured to:

upon receiving the flush frame:

identify a source index for the second switch, wherein the source index is derived from the remote interface index in the flush frame, drain one or more virtual output queues of the second switch referred to by the source index, and send the acknowledgment frame to the FC switch.

* * * * *